United States Patent [19]

Klemen et al.

[11] Patent Number: 5,620,057
[45] Date of Patent: Apr. 15, 1997

[54] ELECTRIC VEHICLE BATTERY ENCLOSURE

[75] Inventors: Donald Klemen, Carmel; Steven R. McMullen, Anderson, both of Ind.

[73] Assignee: General Motors Corporation, Detroit, Mich.

[21] Appl. No.: 358,277

[22] Filed: Dec. 19, 1994

[51] Int. Cl.$^6$ .................................................. B60R 16/04
[52] U.S. Cl. .......................................... 180/68.5; 180/65.1
[58] Field of Search ................................. 180/65.1, 65.3, 180/68.1, 68.5, 220, 68.2

[56] References Cited

U.S. PATENT DOCUMENTS

| | | | |
|---|---|---|---|
| 4,216,839 | 8/1980 | Gould et al. ........................ | 180/168.5 |
| 4,327,809 | 5/1982 | Fenstermaker ..................... | 180/68.5 |
| 4,858,565 | 8/1989 | King .................................... | 180/68.1 |
| 5,392,873 | 2/1995 | Masuyama et al. ................. | 180/68.5 |
| 5,490,572 | 2/1996 | Tajiri et al. ........................ | 180/65.1 |
| 5,513,721 | 5/1996 | Ogawa et al. ....................... | 180/68.5 |

*Primary Examiner*—Anne Marie Boehler
*Attorney, Agent, or Firm*—Lawrence B. Plant

[57] ABSTRACT

Assembly for the thermal management and protection of an electric vehicle battery pack from road water. The assembly includes a corrugated tray for supporting the pack, a housing sealed to the tray, a fan for forcing air through the housing, exhaust vents in the tray for exhausting the air beneath the vehicle, and a shield to prevent road water from entering the housing through the vents.

13 Claims, 3 Drawing Sheets

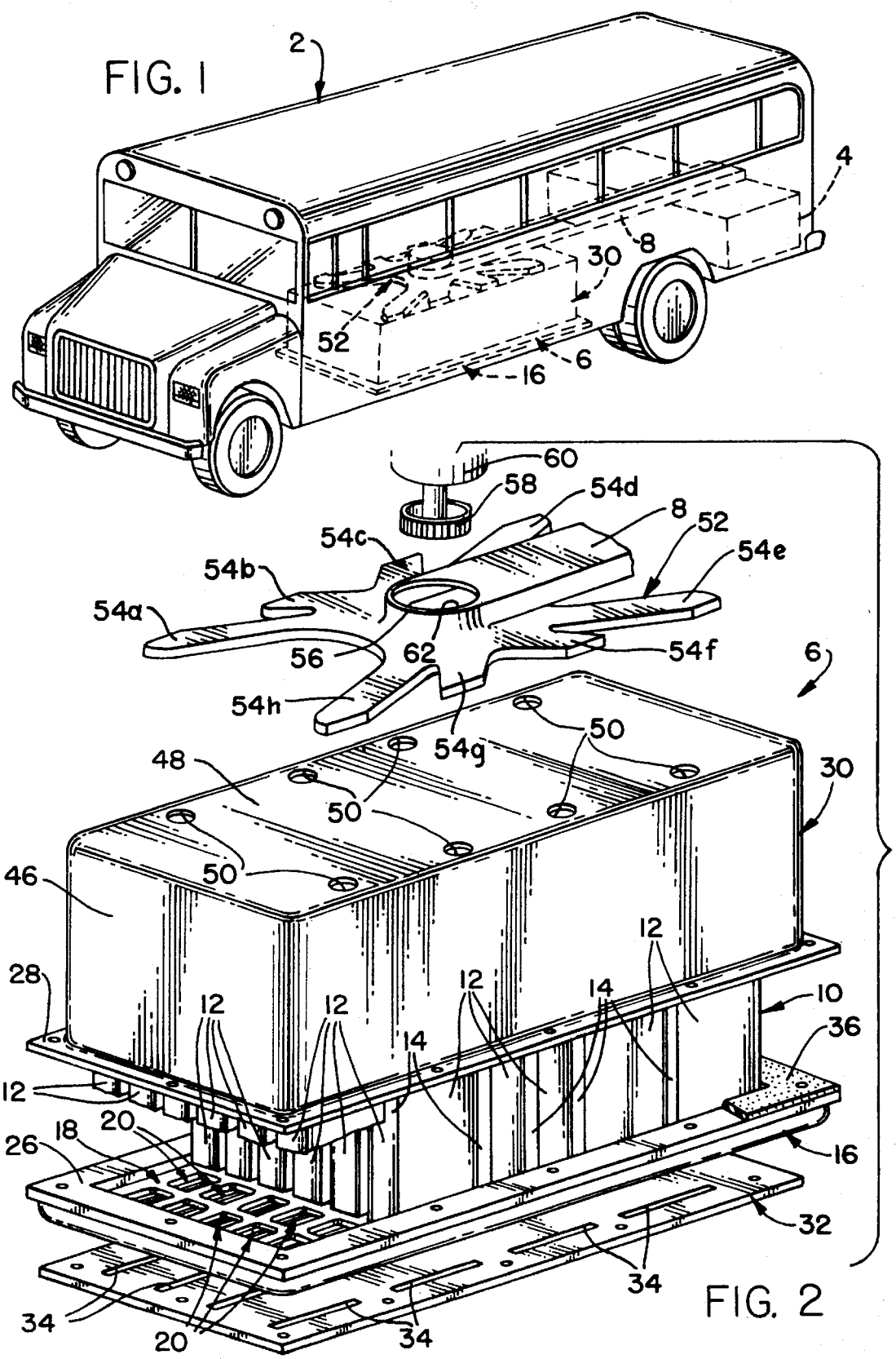

ELECTRIC VEHICLE BATTERY ENCLOSURE

This invention relates to an enclosure for an electric vehicle battery pack and more particularly to an enclosure for controlling the temperature of the battery pack and protecting it from road water.

BACKGROUND OF THE INVENTION

Electric vehicles require a battery pack comprising a plurality of individual batteries electrically coupled together to provide the necessary energy/power for the vehicle's drive motor(s). The term "electric vehicle" as used herein is intended to include both "all electric" and so-called "hybrid electric" vehicles. Hybrid electric vehicles differ from "all electric" vehicles in that they also include an internal combustion engine coupled in various ways with the vehicle's electric drive system as is well known to those skilled in the art. Batteries are temperature sensitive in that they can be damaged if too hot and lose performance if too cold. For any particular type of battery there is a desirable temperature window within which that type of battery prefers to operate.

In cold weather it is desirable to heat the battery pack to improve its electrical performance and in warm weather it is desirable to cool the battery pack to protect it. However, thermal management of a battery pack is much more difficult then the thermal management of a single battery. For example, the center of the battery pack can frequently run much hotter then batteries along the periphery of the pack unless precautions are taken to equilibrate the temperature throughout the battery pack. Moreover depending on their state of charge, different batteries in the pack will generate different temperature when the same amount of current passing therethrough. Hence, temperatures will vary at different locations within the pack. Regardless, in cold weather it is desirable to heat the battery pack to improve its electrical performance and in warm weather it is desirable to cool the battery pack to protect it.

Location of a battery pack in an electric vehicle is an important consideration in the design of the vehicle. Because of its typically high mass and the need to have room for occupants within the vehicle, manufacturers have typically located the battery pack as low as possible in the vehicle. Locating a battery pack low in a vehicle can expose the battery pack to road water and the like, especially a battery pack which is housed in an enclosure which is vented through the underside of the vehicle.

BRIEF DESCRIPTION OF THE INVENTION

The present invention provides an enclosure for an electric vehicle battery pack specifically adapted for heating/cooling the battery pack while, at the same time, protecting it from incursions from road water or the like. More specifically, the present invention provides an electric vehicle having an assembly for the forced convective thermal management of a battery pack and protection thereof from road water. The assembly comprises a tray suspended from the underbody of the vehicle and supporting a plurality of batteries comprising the battery pack. Each battery in the pack is spaced from the next via a gap through which heating/cooling air is pumped depending on the temperature needs of the battery pack at the time. The tray has a floor which supports the batteries and includes a plurality of vents so that air pumped through the interbattery gaps can readily escape through the vents. Preferably the vents are in substantial registry with the gap between the several batteries. A housing is secured, and preferably sealed, to the tray so as to enclose the batteries. A fan pumps ambient or heated air into the housing so as to (1) pressurize the housing, (2) flow the cooling/heating air through the gaps between the batteries, and (3) exhaust it out the vents in the floor of the tray. The floor of the tray will preferably be corrugated (and most preferably have a waffle-like structure) which provides considerable strength for supporting the batteries without resorting to an untoward amount of material. Moreover, the corrugated floor provides a plurality of depressions or valleys where the floor vents reside for best drainage of any water that might enter the enclosure or condense therein. A splash guard underlies the tray to shield the batteries by keeping road water from splashing back up into the housing via the vents. The splash guard has a plurality of apertures therein which are laterally offset from, or in misalignment with, the vents in the floor of the tray, thus providing a tortuous path for road splash to traverse before it could enter the vents. Air exiting the vents flows laterally to the offset apertures before exiting the underside of the vehicle. The vents in the tray's floor as well as the apertures in the shield are preferably elongated slots which run parallel to each other and to the gaps between the several batteries.

The housing is preferably sealed (i.e., water tight) to the tray which prevent standing water from rising to a significant level with the housing when it is pressurized by the fan or otherwise sealed closed as might otherwise occur in the event that the electric vehicle has to ford or stand in deep water (e.g., on flooded roads).

The assembly will preferably include an air distribution plenum atop the housing and communicating with the interior of the housing via a plurality of openings in the ceiling of the housing. In a most preferred embodiment, the fan is mounted in the plenum.

BRIEF DESCRIPTION OF THE DRAWINGS

FIG. 1 is a perspective view of an electric bus (hybrid type);

FIG. 2 is an exploded perspective view of the battery pack enclosure;

DETAILED DESCRIPTION OF A PREFERRED EMBODIMENT OF THE INVENTION

FIG. 1 depicts a bus 2 having a hybrid electric propulsion system including an internal combustion engine (not shown) housed in an engine compartment 4 at the rear of the bus 2, and a battery pack enclosure 6 suspended from the underbody of the vehicle between the front and rear wheels thereof. A duct 8 communicates the engine compartment 4 with the battery pack enclosure 6 as will be discussed in more detail hereinafter.

Figure 3:
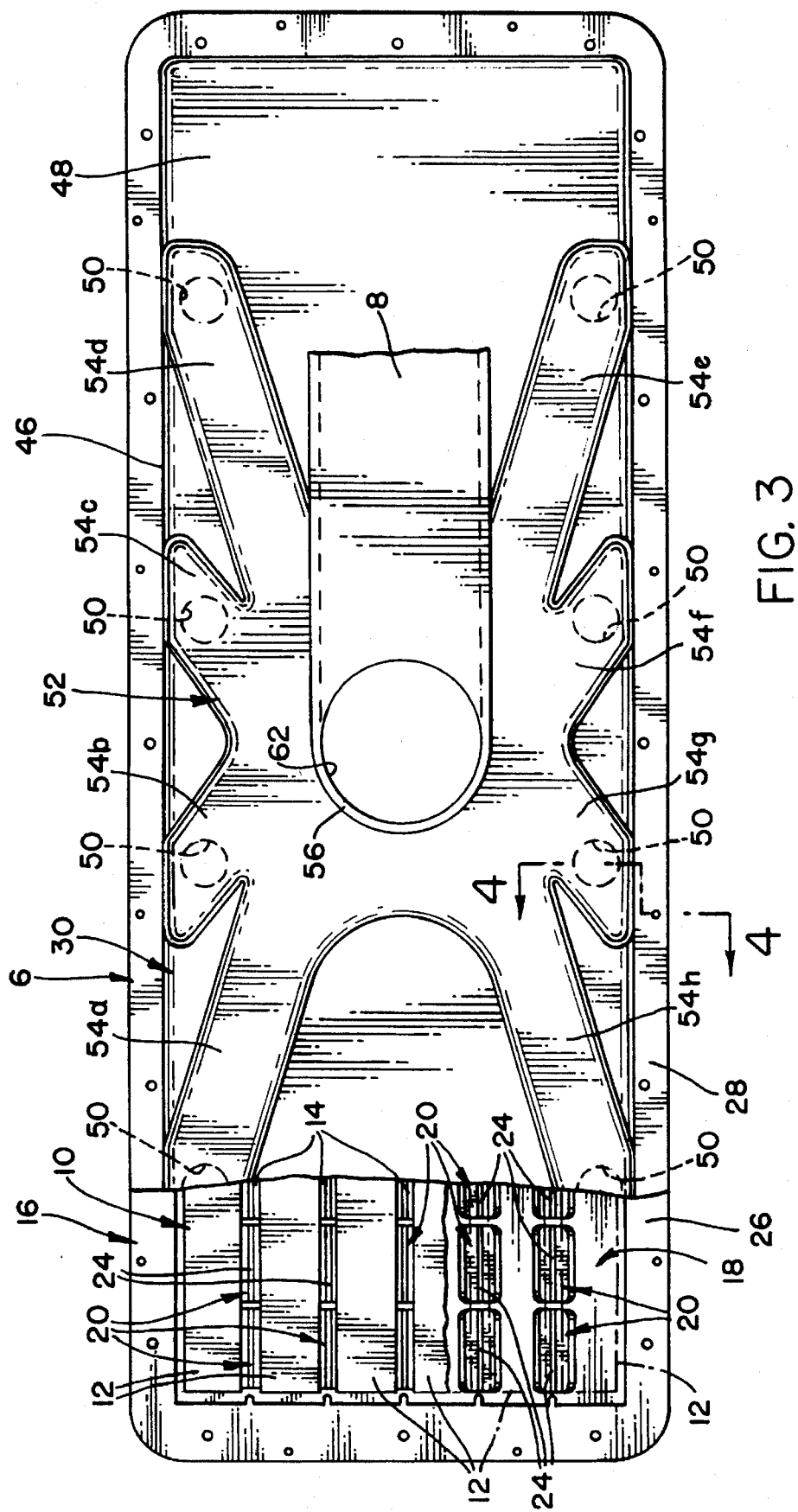
FIG. 3 is a plan view of the battery pack enclosure of FIG. 2.
Figure 4:
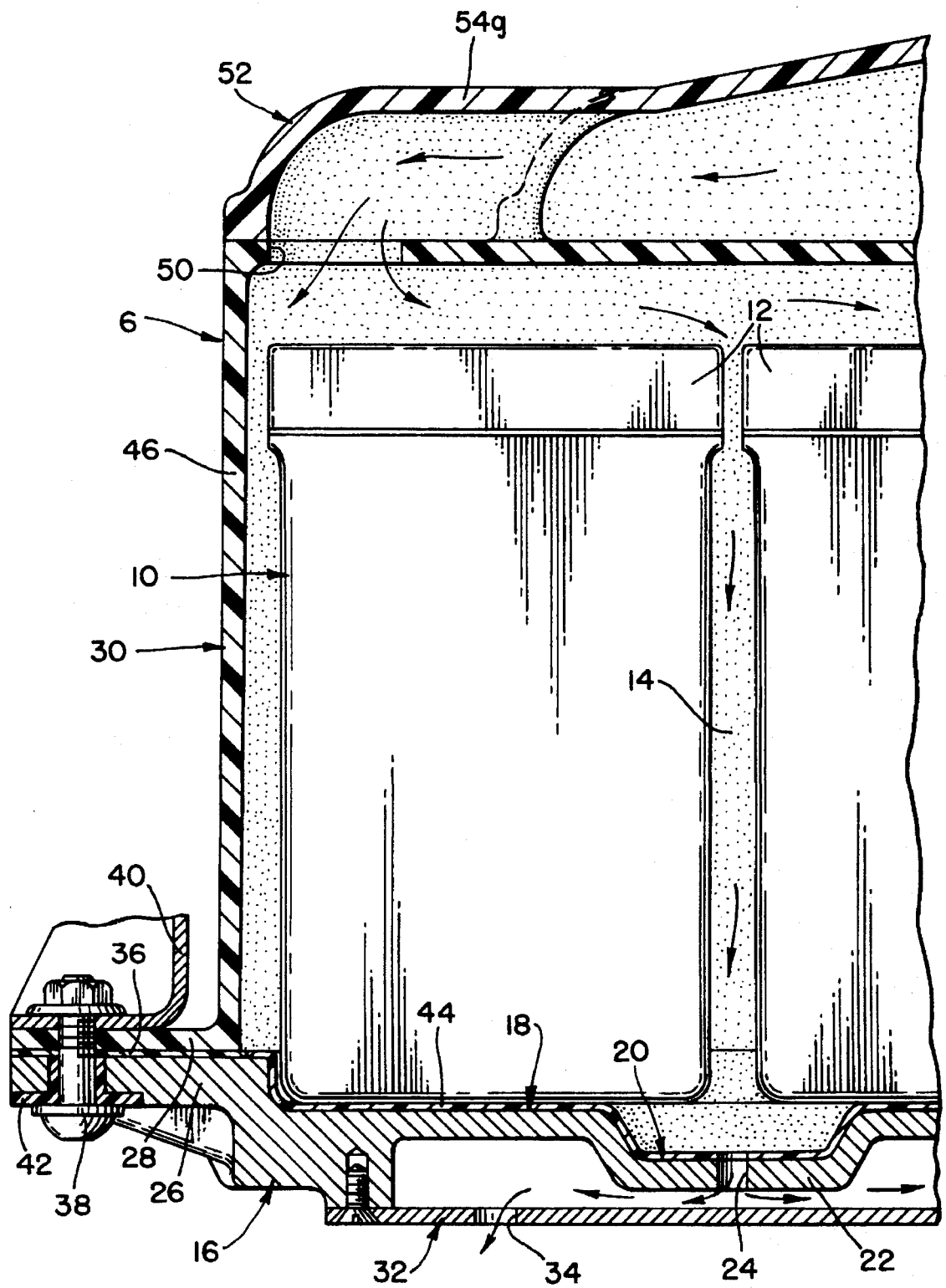
FIG. 4 is a view in the direction 4—4 of FIG. 3.

FIGS. 2–4 show a battery pack 10 comprising a plurality of individual batteries 12 each separated one from the next via a gap 14 and supported in an underlying tray 16. The tray 16 has a waffle-like, corrugated floor 18 including a plurality of depressions or valleys 20 therein. The floor 22 of each depression 20 includes a vent slot 24 (see FIGS. 3 and 4) for exhausting air from the enclosure as will be discussed in more detail hereinafter. A peripheral flange 26 surrounds the tray 16 for bolting to a mating flange 28 on the lower edge of a housing 30. A plate-like splash guard or shield 32 is bolted to the underside of the tray 16 so as to prevent road water from splashing up into the battery pack through the vents 24. The shield 32 includes a plurality of slot-like apertures 34 which are intentionally offset (i.e., misaligned with) from the slots 24 in the depressions 20 of the tray 16 so as to provide a tortuous path for any road water to traverse before it could enter the battery pack 10 via the vents 24.

The housing 30 is sealingly (i.e., water-tight) secured to the tray 16 by bolting the flange 26 to the flange 28 with a sealing gasket 36 sandwiched therebetween. Bolts 38 hold the flanges 28 and 26 together and may also serve to secure the enclosure 6 to an appropriate structural part 40 on the underside of the vehicle 2. An insulating bushing 42 electrically insulates the battery enclosure 6 from the vehicle 2. As best shown in FIG. 4, the tray 16 will be coated with a corrosion resistant plastic coating 44 to protect the floor 18 of the tray 16 from corrosion either from the batteries electrolyte (i.e., if they leaked) or from any road water that might invade the enclosure 6.

The housing 30 will preferably comprise a nonconductive, fiberglass-reinforced plastic for lightweight strength and electrical insulation of the battery pack 10 from the vehicle 40. The housing 30 comprises sidewalls 46 and a ceiling 48 in a one-piece molded construction. The ceiling 48 includes a plurality of openings 50 for admitting warm or cool air, as needed, into the housing 30 to pressurize the housing 30 and flow air therethrough to control the temperature of the batteries therein as well as keep the enclosure 6 dry. An air plenum 52 comprises a plurality of air distribution arms 54a–54h which extends substantially radially outwardly from a central hub 56 which is connected to the duct 8 extending to the engine compartment 4 at the rear of the bus. A squirrel-cage fan 58 powered by an electric motor 60 is inserted into an opening 62 in the hub 56, and draws warm air from the engine compartment 4 through the duct 8 for distribution throughout the arms 54a–54h of the plenum 52 and thence into the housing 30 via the several openings 50. While any of a number of plenum arrangements/designs might be suitable, the particular arrangement depicted optimally equalizes the pressure and air flow through the housing 30 for optimal thermal management of the battery pack 10 therein. Likewise the fan may be mounted elsewhere in the vehicle and its output ducted into the enclosure 6.

If battery cooling is desired, the duct 8 is provided with a damper (not shown) which may be opened to the ambient air which is drawn through the duct 8 via the fan 58 and pumped downwardly through the gaps 14 between the several batteries 12 for cooling. The air exits the housing 30 via vent slots 24 in the depressions 20 formed in the floor 18 of the tray 16. At this point, the air exiting the vents 24 is diverted in the manner shown by the arrows by the shield 32 and eventually exits the battery pack beneath the vehicle via the apertures 34.

Since air is being pumped into the housing 30, and the tray 16 is sealed to the bottom edge of the housing 30, the housing 30 will have a superambient internal pressure. With the housing 30 so pressurized, road water cannot enter the housing 30 via the apertures 34 and vents 24 even when the tray 16 is submerged in water as may occur for example when the electric vehicle is fording a deep water situation such as may occur on a flooded street. Moreover with the damper in the duct 8 closed tightly, and the housing 30 sealed water-tight to the tray 16, any water that might enter the enclosure 6 while the fan is turned off and incident to the vehicle's standing in a pool of water (e.g., stalled in a flooded road) can only rise to a certain level in the enclosure before it compresses the air therein to the point that no further water can enter the enclosure.

While the invention has been described in terms of a certain specific embodiment thereof it is not intended to be limited thereto but rather only to the extent set forth hereafter in the claims which follow.

The embodiments of the invention in which an exclusive property or privilege is claimed is defined as follows:

1. An electric vehicle having an underbody and an assembly for the forced convective thermal management of a battery pack and protection thereof from road water, characterized in that said assembly comprises:

a tray secured to said underbody and supporting a plurality of batteries each spaced one from the next by a gap therebetween, said tray having a floor supporting said batteries and a plurality of vents extending through said floor beneath said batteries;

a housing enclosing said batteries and secured to said tray, said housing having side walls encircling said batteries and a ceiling overlying said batteries;

a fan operatively associated with said housing for pressurizing said housing with air, and flowing such air through each said gap and out of said housing via said vents; and a splash guard underlying said tray for preventing road water from splashing up in said housing via said veins, said splash guard comprising a shield having a plurality of apertures therein offset from said vents and through which air exhausted through said vents flows to beneath said vehicle.

2. An electric vehicle according to claim 1 wherein said housing is secured to said tray by a water-tight seal.

3. An electric vehicle according to claim 2 wherein said housing and said tray each have a peripheral flange extending outwardly therefrom and said flanges are secured to each other so as to effect said seal.

4. An electric vehicle according to claim 1 wherein said vents are each in substantial registry with a said gap.

5. An electric vehicle according to claim 4 wherein said vents are slots extending parallel to said gaps between said batteries.

6. An electric vehicle according to claim 5 wherein said apertures are slots extending parallel to said vent slots.

7. An electric vehicle according to claim 1 wherein said floor has a plurality of depressions therein and said vents are at the bottoms of said depressions.

8. An electric vehicle according to claim 7 wherein said floor is corrugated.

9. An electric vehicle according to claim 1 wherein said shield is secured to the underside of said tray.

10. An electric vehicle according to claim 9 wherein said shield comprises a plate.

11. An electric vehicle having an underbody and an assembly for the forced convective thermal management of a battery pack and protection thereof from road water, characterized in that said assembly comprises:

a tray located on said underbody and supporting a plurality of batteries each spaced one from the next by a gap therebetween, said tray having a floor supporting said batteries and a plurality of vents in said floor each in substantial registry with a said gap;

a housing enclosing said batteries and sealed to said tray, said housing having side walls encircling said batteries and a ceiling overlying said batteries;

an air distribution plenum atop said ceiling;

a plurality of openings in said ceiling communicating said plenum with the interior of said housing;

a fan operatively associated with said plenum for pressurizing said plenum and said housing with air, and flowing such air through (a) said openings, (b) each said gap and (c) out of said housing via said vents; and a splash guard underlying said tray for preventing road water from splashing up into said housing via said vents, said guard comprising a shield having a plurality of apertures therein offset from said vents and through which air exhausted through said vents flows to beneath said vehicle.

12. An electric vehicle according to claim 11 wherein said plenum comprises a plurality of arms extending outwardly from a central hub.

13. An electric vehicle according to claim 12 wherein said hub houses said fan.

* * * * *